US011390554B2

(12) United States Patent
Deng et al.

(10) Patent No.: US 11,390,554 B2
(45) Date of Patent: Jul. 19, 2022

(54) LEAD INSERTION SYSTEM

(71) Applicants: Tyco Electronics (Shanghai) Co. Ltd., Shanghai (CN); TE Connectivity Services GmbH, Schaffhausen (CH); Kunshan League Automechanism Co., Ltd., Kunshan (CN)

(72) Inventors: Yingcong Deng, Shanghai (CN); Dandan Zhang, Shanghai (CN); Roberto Francisco-Yi Lu, Bellevue, WA (US); Fengchun Xie, Shanghai (CN); Haidong Wu, Shanghai (CN)

(73) Assignees: TE Connectivity Services GmbH, Schaffhausen (CH); Tyco Electronics (Shanghai) Co. Ltd., Shanghai (CN); Kunshan League Automechanicsm Co., Ltd., Kunshan (CN)

( * ) Notice: Subject to any disclaimer, the term of this patent is extended or adjusted under 35 U.S.C. 154(b) by 167 days.

(21) Appl. No.: 16/701,612

(22) Filed: Dec. 3, 2019

(65) Prior Publication Data

US 2020/0172424 A1 Jun. 4, 2020

(30) Foreign Application Priority Data

Dec. 3, 2018 (CN) ........................ 201811465164.6

(51) Int. Cl.

*C03B 23/13* (2006.01)
*C03B 23/09* (2006.01)

(52) U.S. Cl.

CPC ............ *C03B 23/13* (2013.01); *C03B 23/099* (2013.01)

(58) Field of Classification Search

None

See application file for complete search history.

(56) References Cited

U.S. PATENT DOCUMENTS 5,549,496 A * 8/1996 Foo ...................... C03B 23/065 445/22
2007/0147748 A1* 6/2007 Kume .................. C03B 23/207 385/96
2017/0066143 A1* 3/2017 Hantzschel ......... B29C 66/9121
2021/0107233 A1* 4/2021 Lenz ...................... F16L 13/02

* cited by examiner

*Primary Examiner* — Queenie S Dehghan
(74) *Attorney, Agent, or Firm* — Barley Snyder

(57) ABSTRACT

A lead insertion system adapted to insert a lead into a glass tube includes a first robot on which a first gripper is mounted and a second robot on which a second gripper is mounted. The first gripper grips the glass tube and the second gripper grips the lead. The lead insertion system includes a flame heater heating the glass tube gripped by the first robot and the lead gripped by the second robot with a flame. The second robot inserts the lead into the glass tube held by the first robot with the lead heated by the flame and the glass tube heated and softened by the flame.

16 Claims, 1 Drawing Sheet

100
200
10
20
110
210
310
300

LEAD INSERTION SYSTEM

CROSS-REFERENCE TO RELATED APPLICATION

This application claims the benefit of the filing date under 35 U.S.C. § 119(a)-(d) of Chinese Patent Application No. 201811465164.6, filed on Dec. 3, 2018.

FIELD OF THE INVENTION

The present invention relates to a lead insertion system and, more particularly, to a lead insertion system adapted to insert a lead into a glass tube.

BACKGROUND

A temperature sensor can include a glass tube and a lead, usually a metal lead, inserted into the glass tube. In the process of manufacturing the temperature sensor, it is necessary to heat the glass tube to soften the glass tube, so that the lead may be successfully inserted into the glass tube.

The lead is generally manually inserted into the glass tube. For example, a worker grips the glass tube with one hand using a special gripper and places the glass tube on the flame for heating. With the other hand, the worker grips the lead through another special gripper and inserts the lead into the heated and softened glass tube. However, it is inefficient to insert the lead into the glass tube manually. Further, the heating time of the glass tube cannot be accurately controlled, and the glass tube cannot be accurately heated to a predetermined softening degree, which may reduce the quality of the temperature sensor.

SUMMARY

A lead insertion system adapted to insert a lead into a glass tube includes a first robot on which a first gripper is mounted and a second robot on which a second gripper is mounted. The first gripper grips the glass tube and the second gripper grips the lead. The lead insertion system includes a flame heater heating the glass tube gripped by the first robot and the lead gripped by the second robot with a flame. The second robot inserts the lead into the glass tube held by the first robot with the lead heated by the flame and the glass tube heated and softened by the flame.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
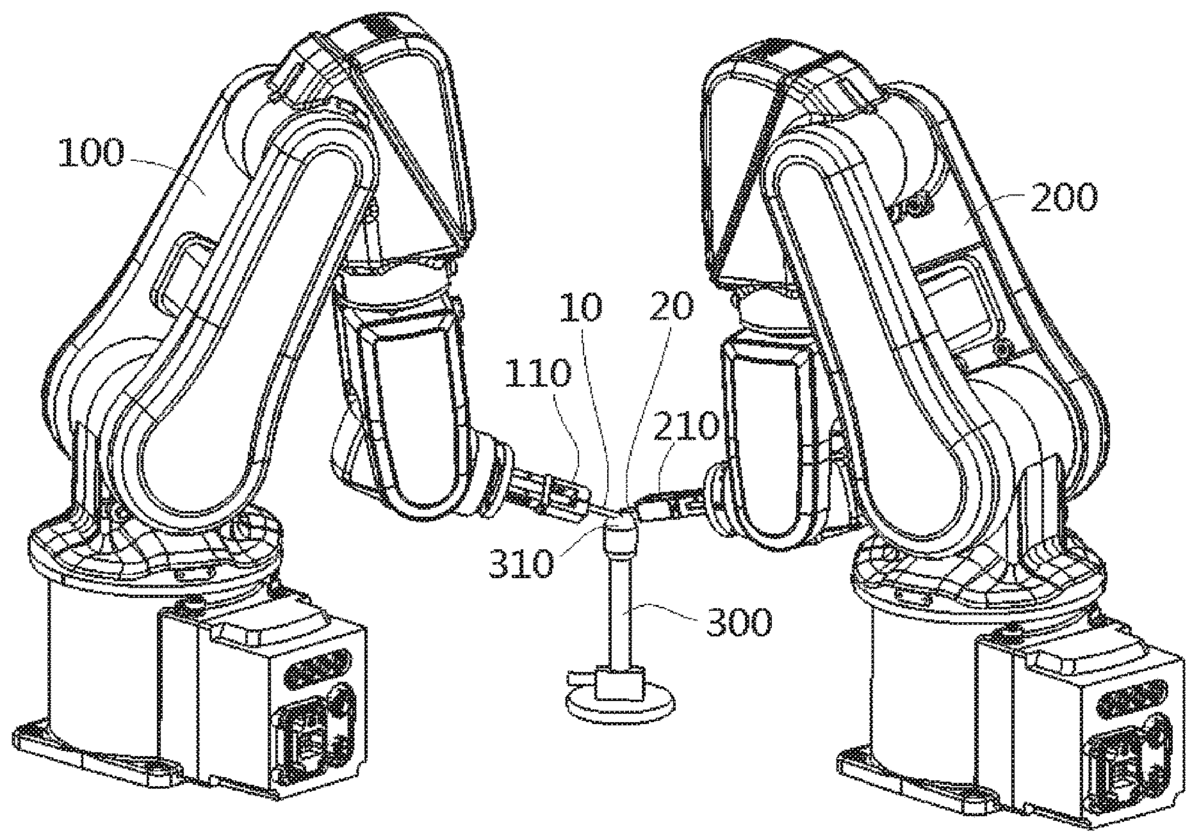
FIG. 1 is a perspective view of a lead insertion system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
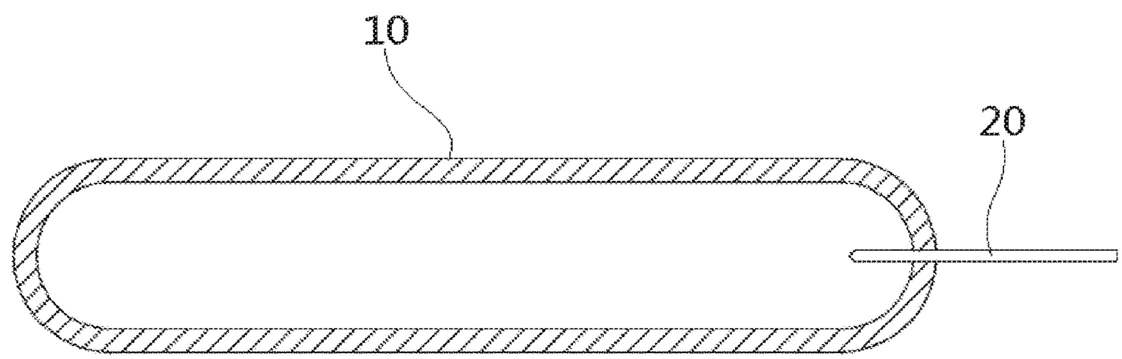
FIG. 2 is a sectional side view of a lead inserted into a glass tube.

A lead insertion system according to an embodiment, as shown in FIG. 1, comprises a first robot 100, a second robot 200, and a flame heater 300. The lead insertion system is adapted to automatically insert a lead 20 into a glass tube 10, as shown in FIGS. 1 and 2.

As shown in FIG. 1, a first gripper 110 adapted to grip the glass tube 10 is mounted on the first robot 100. A second gripper 210 adapted to grip the lead 20 is mounted on the second robot 200. The flame heater 300 is configured to generate a flame 310 and heat the glass tube 10 gripped by the first robot 100 and the lead 20 gripped by the second robot 200 with the flame 310. The second robot 200 is adapted to insert the heated lead 20 into the heated and softened glass tube 10 held by the first robot 100.

In an embodiment, the first robot 100 is adapted to control the heating time of the glass tube 10 on the flame 310 to ensure that the glass tube 10 has been heated to a predetermined softening degree at the beginning of inserting the lead 20 into the glass tube 10. In this way, the lead 20 may be smoothly and successfully inserted into the glass tube 10. The second robot 200, in an embodiment, is adapted to control the heating time of the lead 20 on the flame 310 to ensure that the lead 20 has been heated to a predetermined temperature at the beginning of inserting the lead 20 into the glass tube 10. In this way, in the process of inserting the lead 20 into the glass tube 10, a portion of the glass tube 10 in contact with the lead 20 may be heated and melted by the lead 20 with the predetermined temperature, and which may ensure that the lead 20 is more smoothly and successfully inserted into the glass tube 10.

As shown in FIG. 1, the flame 310 of the flame heater 300 is adapted to heat the glass tube 10 and the lead 20 simultaneously. The lead 20 and the glass tube 10 are always placed on and heated by the flame 310 throughout the process of inserting the lead 20 into the glass tube 10. In this way, it may prevent the glass tube 10 from hardening in the process of inserting the lead 20 into the glass tube 10, thus ensuring that the lead 20 may be smoothly inserted into the glass tube 10.

In the process of inserting the lead 20 into the glass tube 10, as shown in FIG. 1, the first robot 100 holds the glass tube 10, and the second robot 200 moves the lead 20 towards the glass tube 10 to insert the lead 20 into the glass tube 10 held by the first robot 100. After inserting the lead 20 into the glass tube 10, the second gripper 210 of the second robot 200 loosens the lead 20, and the first robot 100 removes the glass tube 10 inserted with the lead 20 from the flame 310. After the glass tube 10 and the lead 20 are cooled, the glass tube 10 hardens, and the inserted lead 20 is fixed on the glass tube 10.

As shown in FIGS. 1 and 2, in an embodiment, an end of the lead 20 is inserted into the glass tube 10 from an end of the glass tube 10. The first robot 100 is adapted to move the end of the gripped glass tube 10 onto the flame 310 for heating, and the second robot 200 is adapted to move the end of the gripped lead 20 onto the flame 310 for heating.

In the embodiment shown in FIG. 1, the first robot 100 and the second robot 200 are each multi-degree-of-freedom robots. The first robot 100 and the second robot 200 are respectively arranged on both sides of the flame heater 300. In this way, the lead 20 may be efficiently and rapidly inserted into the glass tube 10 through the cooperation of the first robot 100 and the second robot 200.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A lead insertion system adapted to insert a lead into a glass tube, comprising:
- a first robot on which a first gripper is mounted, the first gripper grips the glass tube;
- a second robot on which a second gripper is mounted, the second gripper grips the lead, first robot holds the glass tube and the second robot moves the lead towards the glass tube; and
- a flame heater heating the glass tube gripped by the first robot and the lead gripped by the second robot with a flame, the second robot inserts the lead into the glass tube held by the first robot with the lead heated by the flame and the glass tube heated and softened by the flame, after the lead is inserted into the glass tube, the second gripper loosens the lead and the first robot removes the glass tube inserted with the lead from the flame.

2. The lead insertion system of claim 1, wherein the first robot controls a heating time of the glass tube on the flame to heat the glass tube to a predetermined softening degree at a beginning of inserting the lead into the glass tube.

3. The lead insertion system of claim 2, wherein the second robot controls a heating time of the lead on the flame to heat the lead to a predetermined temperature at the beginning of inserting the lead into the glass tube.

4. The lead insertion system of claim 3, wherein a portion of the glass tube in contact with the lead is heated and melted by the lead in the process of inserting the lead into the glass tube.

5. The lead insertion system of claim 4, wherein the flame of the flame heater simultaneously heats the glass tube and the lead.

6. The lead insertion system of claim 5, wherein the lead and the glass tube are always placed on and heated by the flame throughout the insertion of the lead into the glass tube.

7. The lead insertion system of claim 1, wherein an end of the lead is inserted into the glass tube from an end of the glass tube.

8. The lead insertion system of claim 7, wherein the first robot moves the end of the glass tube onto the flame for heating.

9. The lead insertion system of claim 8, wherein the second robot moves the end of the lead onto the flame for heating.

10. The lead insertion system of claim 1, wherein the first robot and the second robot are each a multi-degree-of-freedom robot.

11. The lead insertion system of claim 1, wherein the first robot and the second robot are arranged on opposite sides of the flame heater.

12. A lead insertion system adapted to insert a lead into a glass tube, comprising:
- a flame heater for heating the glass tube;
- a first robot on which a first gripper is mounted, the first robot adapted to automatically:
  - grip the glass tube with the first gripper; and
  - place the glass tube in a flame of the heater;
- a second robot on which a second gripper is mounted, the second robot adapted to automatically:
  - grip the lead with the second gripper;
  - move the lead into the flame;
  - insert the lead into the glass tube held by the first robot with the lead heated by the flame and the glass tube heated and softened by the flame; and
  - after the lead is inserted into the glass tube, release the lead, the first robot removing the glass tube inserted with the lead from the flame after the lead has been released by the second robot.

13. The lead insertion system of claim 12, wherein the first robot is further adapted to control a heating time of the glass tube on the flame to heat the glass tube to a predetermined softening degree at a beginning of inserting the lead into the glass tube.

14. The lead insertion system of claim 13, wherein the second robot is further adapted to control a heating time of the lead on the flame to heat the lead to a predetermined temperature at the beginning of inserting the lead into the glass tube.

15. The lead insertion system of claim 14, wherein a portion of the glass tube in contact with the lead is heated and melted by the lead in the process of inserting the lead into the glass tube.

16. The lead insertion system of claim 15, wherein the lead and the glass tube are always placed on and heated by the flame throughout the insertion of the lead into the glass tube.

* * * * *